United States Patent [19]

Flocchini

[11] Patent Number: 4,716,635
[45] Date of Patent: Jan. 5, 1988

[54] MECHANICAL FUSE

[76] Inventor: Andrew J. Flocchini, 7050 Lakeville Hwy., Petaluma, Calif. 94952

[21] Appl. No.: 387,383

[22] Filed: Jun. 11, 1982

[51] Int. Cl.$^4$ ............................................. A44B 19/00
[52] U.S. Cl. ......................................... 24/588; 24/662
[58] Field of Search ....... 24/230 R, 230 AK, 230 BC, 24/213 C, 217 W, 218, 261 R, 265 R

[56] References Cited

U.S. PATENT DOCUMENTS

| 256,755 | 4/1882 | Spangler | 24/230 R X |
| 278,346 | 5/1883 | Long | 24/230 R X |
| 601,384 | 3/1898 | Schooley | 24/261 R |
| 717,371 | 12/1902 | Faulkner | 24/230 R |
| 1,389,173 | 8/1921 | Watkins | 24/230 R |
| 1,571,117 | 1/1926 | Guttman et al. | 24/230 R |
| 2,833,010 | 5/1958 | Rosenthal | 24/265 R X |
| 3,686,711 | 8/1972 | Kuramoto et al. | 24/265 R X |

Primary Examiner—Peter A. Aschenbrenner
Attorney, Agent, or Firm—Townsend and Townsend

[57] ABSTRACT

A two section mechanical fuse is disclosed. A first spring biased section fabricated from a wire is bent to a triangular configuration. This triangularly bent wire has two overlapping base portions held in side-by-side juxtaposition by the spring force of the wire. A bar having a radially extending tongue is captured within the triangular bent wire section. The tongue is captured between and protrudes outwardly from the side-by-side overlapping base members drawing the attached bar into contact with these side-by-side members. Under normal tensive strain the tongue and bar form the fused link in any tensive member to which the device is inserted, for example the teat cup assembly to a retractor in a dairy farm. Where force exceeding the fused limit is encountered, the tongue draws the bar between the two triangular base pieces. Forced opening of the two side-by-side members occurs, the fuse parts, and breakage elsewhere is averted.

6 Claims, 3 Drawing Figures

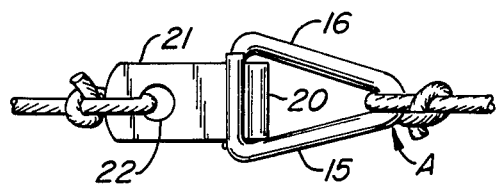
FIG._1.
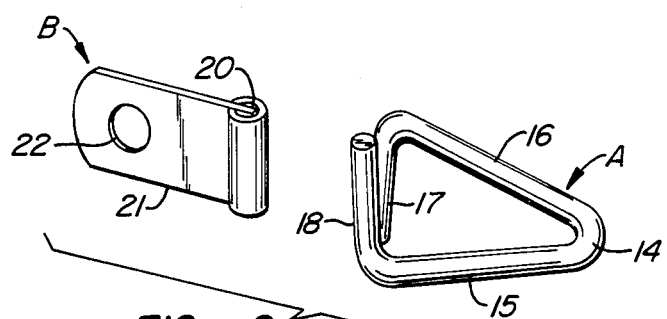
FIG._2.
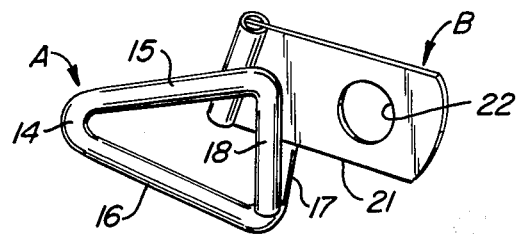
FIG._3.

MECHANICAL FUSE

FIELD OF THE INVENTION

This invention relates to a fuse and to a simply constructed and assembled mechanical fuse.

SUMMARY OF THE PRIOR ART

Mechanical fuses of various types are known. This disclosure relates to a simple two part mechanical fuse which is easy to construct, parts reliably on overload, and may easily be reinserted by hand to restore the fuse length after parting has occurred.

Mechanical fuses typically are relatively complex devices loaded with spring parts. Frequently, such fuses must be reassembled on a laborious basis after they have parted. Few of such fuses can be reliably reassembled by mere manipulation of the hands.

SUMMARY OF THE INVENTION

A two section mechanical fuse is disclosed. A first spring biased section fabricated from a wire is bent to a triangular configuration. This triangularly bent wire has two overlapping base portions held in side-by-side juxtaposition by the spring force of the wire. A bar having a radially extending tongue is captured within the triangular bent wire section. The tongue is captured between and protrudes outwardly from the side-by-side overlapping base members drawing the attached bar into contact with these side-by-side members. Under normal tensive strain the tongue and bar form the fused link in any tensive member to which the device is inserted, for example the teat cup assembly to a retractor in a dairy farm. Where force exceeding the fused limit is encountered, the tongue draws the bar between the two triangular base pieces. Forced opening of the two side-by-side members occurs, the fuse parts, and breakage elsewhere is averted.

OBJECTS AND ADVANTAGES

An object of this invention is to disclose a two section mechanical fuse which is of particularly simple construction. According to this aspect of the invention, a wire is bent into a triangular shape. The wire is bent so that a base leg of the triangle has two side-by-side relatively rigid wire sections.

The second section of this invention includes a bar and a radially protruding tongue extending outwardly from the axis of the bar. In operation the tongue is passed through the paired side-by-side overlapping base members. The bar is disposed inwardly towards and to the center of the triangular section. It is typically captured and prevented from moving side to side out of the grip of the triangular sectioned member by the side triangular wires.

An advantage of the disclosed construction is that the single piece bent wire triangular section with overlaying base sections serves two purposes. First, this section supplies the spring constant that determines overall parting of the mechanical fuse. Secondly and rather suprisingly, the side elements of the triangular shaped section capture the bar ends. The tongue is held firmly between the relatively rigid and overlapping base members.

An additional advantage of this invention is that the fuse is readily assembled. It can be assembled by hand labor in the field and does not require the use of any specialized tools for the coupling of the parted mechanical fuse.

BRIEF DESCRIPTION OF THE FIGURES

The invention is best understood by referring to the specification, and the following figures, in which:

FIG. 1 is a perspective view of the mechanical fuse of this invention in the assembled disposition;

FIG. 2 is a view of the fuse having parted; and,

FIG. 3 is a view of fuse sections being reassembled. sembled.

DETAILED DESCRIPTION OF A PREFERRED EMBODIMENT

Referring to FIG. 2, a piece of stainless steel wire A is bent to a triangular configuration. Bending occurs from an apex 14 into two side members 15, 16. The side members in turn have the respective ends of the wire bent to two base members 17, 18, the base members are held by the spring force of the wire in a juxaposed side-by-side relationship.

The second section of the mechanical fuse consists of a small stainless steel tube 20 having a tongue 21 fastened to the center thereof. Typically, the tongue 21 protrudes radially from the bar 20. The tongue has a hole 22 therein.

Having fully set forth the portions of this invention, the assembly and parting of the fuse may now be discussed with reference to all of the parts.

Regarding assembly (FIG. 3), the tongue portion B is slipped between the juxtaposed ends 17, 18. Such slipping is easily done by hand until such time as the bar 20 becomes captured by the side members 15,16 of the fuse.

Referring to FIG. 1, it will be seen that the side members 15, 16 capture the bar ends of bar 20 firmly there between. The tongue 21 protrudes outwardly from the fuse member. Parting can be readily understood with respect to FIG. 2. Assuming that the force on tongue 21 in one direction and the apex 14 in the other direction exceeds the spring force required to hold the bar 20 between the overlapping base members 17, 18 fuse parting occurs.

The reader will note that this is an extremely simple fuse member to assemble. Specifically by heating and bending the wire member to the triangular configuration and fastening a tongue member onto the bar 20 the fuse member is readily constructed. Thus, the process of assembly is apparent once the simplicity of the construction here is known.

The fuse is intended to be inserted as a link in a tensive member, such as the teat cup assembly to a retractor in a dairy farm. Thus, a first portion of said tensive member is attached to assembly A at apex 14. A second portion of said tensive member is attached to assembly B at hole 22 (FIG. 1).

Variations within the scope of the invention are possible. The invention should only be limited by the breadth of the following claims.

What is claimed is:

1. A two part mechanical fuse for placement as a tensive link for transmitting tension up to a fuse parting force and permitting tension to part the fuse, said fuse comprising: a first wire fuse member, said wire fuse member bent to a triangular configuration with the first and second sides of said wire fuse member joined at an apex and the closing side of said wire fuse member formed of juxtaposed side-by-side ovelapping sections of said wire; said side-by-side overlapping sections of said wire urge one towards one another by the spring force of the wire; a second fuse member including a bar and a tongue extending radially from the axis of said bar, said bar having a length less than the length of said closing side, said tongue passing through said side-by-side sections with said bar toward the interior of the triangle formed by said wire fuse member whereby upon excessive force being drawn to said mechanical fuse said side-by-side sections part disengaging said fuse.

2. A two section mechanical fuse for placement as a tensive link for transmitting tension up to a fuse parting force and permitting tension to part the fuse, said fuse comprising: a first wire fuse member, said wire fuse member including a wire bent so as to dispose the two ends of said wire fuse member in side-by-side parallel juxtaposed relationships; a second fuse member including a bar and protruding tongue, said tongue disposed between said side-by-side wire ends so as to draw said bar into contact with the side-by-side wire ends and permit said fuse to transmit tension, said side-by-side wire ends parting to permit said bar to pass through said wire fuse member upon force exceeding said fuse parting force.

3. The invention of claim 2 and wherein said wire fuse member is bent to a triangular configuration.

4. The invention of claim 2 and wherein said bar is captured at its ends by said bent wire.

5. A method of forming a mechanical fuse comprising the steps of: providing a wire member; bending said wire member to a triangular configuration with the ends of said wire member overlapping one another in side-by-side juxtaposition; providing a bar; attaching a tongue to said bar; passing said tongue between said side-by-side juxtaposed wire ends whereby said bar is captured parallel to said side-by-side wire ends to form said fuse.

6. The invention of claim 5 and wherein said tongue is fastened to said bar to radially protrude therefrom.

* * * * *